D. HOWELL.
Harvester and Thrasher.
No. 99,089
Patented Jan. 25, 1870.
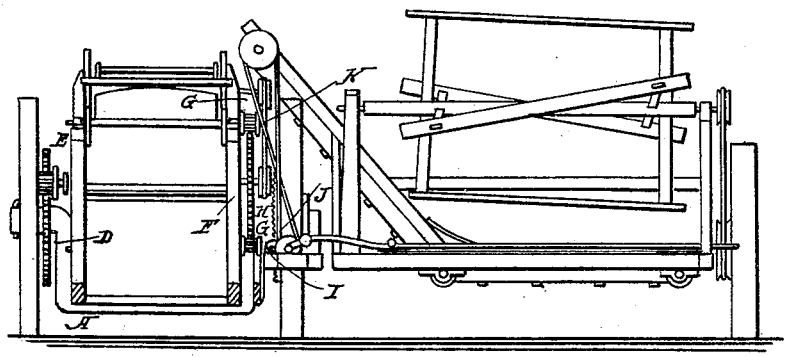
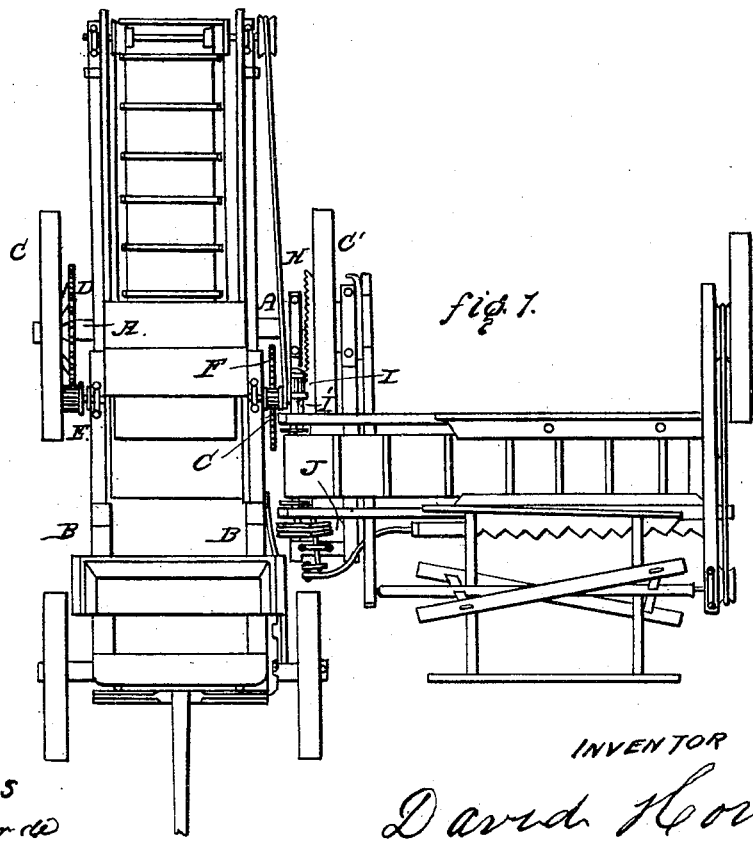
WITNESSES
INVENTOR
David Howell
By his atty C W M Smith

UNITED STATES PATENT OFFICE.

DAVID HOWELL, OF ST. HELENA, CALIFORNIA, ASSIGNOR TO HIMSELF AND CHARLES A. LOWE, OF SAN FRANCISCO, CALIFORNIA.

IMPROVEMENT IN COMBINED HARVESTERS AND THRASHERS.

Specification forming part of Letters Patent No. 99,089, dated January 25, 1870.

*To all whom it may concern:*

Be it known that I, DAVID HOWELL, of St. Helena, in the county of Napa and State of California, have invented certain new and useful Improvements in Harvesters and Thrashing-Machines Combined; and I do hereby declare that the following is a full and exact description of the same, reference being had to the accompanying drawings, and to the letters of reference marked thereon.

The nature of my invention is to so combine a harvester with a thrashing-machine that the draft will be diminished, and the thrasher or separator so simplified in its construction that the cost will be materially reduced; and it consists in the combination and arrangement of parts hereinafter described.

I employ a bent axle, to which the driving-wheels are connected, and between which, on the axle, rests the separator. The forward end of the machine is supported by two bent bars, so that the forward wheels can play under them, which enables me to turn the machine in a very small space. The driver's seat is placed on the top of the arched bars, and is entirely out of the way of the machinery, and the position enables him to obtain a view of the work in passing. By this construction the cylinder and fans are placed nearer the ground, and the necessity of elevating the grain so high to the cylinder is avoided. The grain, after it is thrashed, runs down voluntarily to the shoe, which also saves the necessity of elevating it. The thrasher or separator is run by gearing from one driving-wheel, and the header or harvester by gearing attached to the opposite driving-wheel, and the construction and arrangement are such that increased velocity is imparted to the cylinder and fan.

Some of the parts of my machine are not set forth in the drawings — such, for instance, as the shoe, and elevator that carries the tailings back to the cylinder, and the little elevator that carries the grain to the sack. As these devices are on other machines I have thought it unnecessary to show them in this connection.

Referring to the accompanying drawings, Figure 1 is a plan. Fig. 2 is a sectional elevation taken in front of the fan and cylinder.

A represents the axle, which is bent downward at right angles to admit the separator-body, which rests upon it. To the forward end of the separator are attached flat bars of iron, which extend upward in semicircular curves B B, and connect with the forward running-gear, which admits of the machine being turned in a small space. The driving-wheels C C' are of considerable diameter, and to the inner ends of the hub, or to the disk of the wheel C, is attached a pinion, D, which actuates the lantern or trundle E, the spindle of which extends across the separator between the fan and cylinder to receive the pinion F, which actuates the trundles G G at the end of the fan and cylinder shafts. To the end of this spindle is also keyed a grooved pulley, which is connected by a belt to the straw-carrier. To the face of the opposite wheel C' is attached a side gear, H, the teeth of which engage the trundle I upon the spindle I', that operates the pitman of the sickle or knife. A pulley, J, is attached to the spindle I', which drives the dropper by the belt-connection K, which also passes over a corresponding pulley at the upper end of the said dropper or grain-carrier. The gearing on the side of the machine last described runs the header and grain-carrier, and is entirely independent from the running-gear of the separator, and by thus lowering and connecting the separator to the axle, and applying to each wheel the necessary gearing to actuate each combination or part independent of the other, the power necessary to run the whole machine is so distributed or equalized that but little side draft is had from the header. The knife is actuated by a single gear.

Having thus described my invention, what I claim, and desire to secure by Letters Patent, is—

In a machine of the described construction, the axles A, bars B, driving-wheels C C', pinion D, trundle E, pinion F, trundle G, side gear H, trundle I, pulley J, and belt K, when combined and arranged as described, for the purpose set forth.

In witness whereof I have hereunto set my hand and seal.

DAVID HOWELL. [L. S.]

Witnesses:
E. V. SUTTER,
C. W. M. SMITH.